(No Model.)

M. McGARY.
AUTOMATIC BACKWATER VALVE FOR DRAINS.

No. 371,085. Patented Oct. 4, 1887.

Witnesses:
Herschel W. McCandless
A. B. Boper

Inventor.
Marcellus McGary

United States Patent Office.

MARCELLUS McGARY, OF CRAWFORD STATION, MISSOURI.

AUTOMATIC BACKWATER-VALVE FOR DRAINS.

SPECIFICATION forming part of Letters Patent No. 371,085, dated October 4, 1887.

Application filed December 27, 1886. Serial No. 222,721. (No model.)

*To all whom it may concern:*

Be it known that I, MARCELLUS McGARY, a citizen of the United States, residing at Crawford Station, Scotland county, Missouri, have invented a new and useful Machine for Preventing the Backflow of Water in Drains, of which the following is a specification.

My invention relates to improvements in automatically preventing backwater in drains, in which a float operates in connection with a valve to open or close the end of a discharging drain-pipe, as occasion may require.

The objects of my invention are, first, to drain lands, cellars, and other reservoirs of surface water which is not due to an overflowed condition from a stream, as backwater, and, second, to prevent backwater from flowing in from a rising stream or tide and inundating leveed lands, cellars, and other reservoirs. I attain these objects by the mechanism illustrated in the accompanying drawings, in which—

Figure 1:
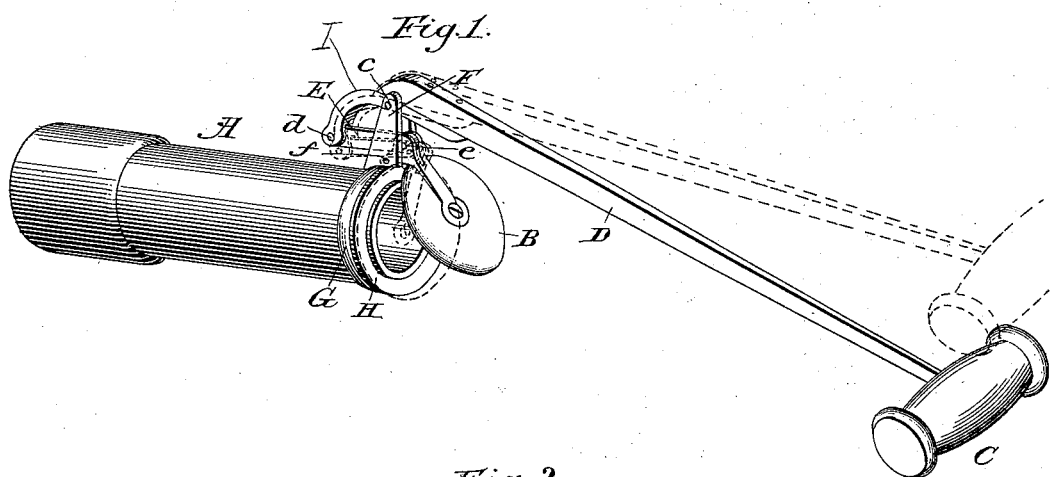
Figure 2:
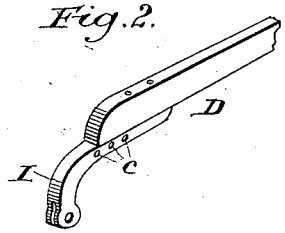
Figure 3:
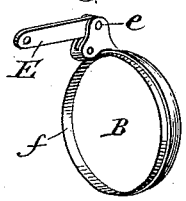

Figure 1 is an entire view of the whole machine attached to a drain-pipe; Fig. 2, a side view of a section of the leverage part of the machine with the shank attached, and Fig. 3 an under view of valve with drive-bar attached.

Similar letters refer to similar parts throughout the several views.

The drain-pipe A constitutes the support for the machine, the collar G being fitted over the drain-pipe A in a firm and substantial manner, standing erect, with its two uprights, $f f$, for the support of the float-arm D, which is held in place by the fulcrum-pin, extending through from one of the uprights $f$ to the other, and passing through the float-arm D, so as to permit of a pump-handle motion. The float-arm D, with its shank attachment I, is perforated with several holes, $c\ c\ c$, Fig. 2, for the insertion of the fulcrum-pin, as occasion may require, to change the leverage relation where it is desirable to increase or diminish the distance through which the float C must pass in order to close or open the cap B.

To the long arm of the lever D, at its farthest extremity, is firmly attached the float C, of any light material having buoyant power. To the other arm, but extending beyond the fulcrum-point, is the metallic shank I, with its fulcrum perforations $c\ c\ c$, Fig. 2, and curved downward at its farthest extremity and there perforated for the reception of a pin which hinges it to the flat end of the connecting-link or drive-bar E, the end of the shank I being split to receive it.

The connecting-link or drive-bar E is simply a flat piece of metal perforated at each end, so as to be attached at one end by a pin to the shank I, as above set forth, and at the other to the double ears of the valve B, which valve has also another perforation in its ears for the purpose of hinging it between the uprights of the collar G, and the ears serving the double purpose of a lever and fulcrum for the movement of the valve B. The valve B is supplied on its lower side, near the outer edge, with a V-shaped flange to fit closely to the rubber washer H when the valve is closed, the washer H being snugly fitted over the discharging end of the drain-pipe A and against the collar G.

With the drain-pipe A placed in a nearly horizontal position the uprights of the collar G stand erect, and at low water the float C hangs low or lightly floating on the water and the valve B is held open, thus permitting the discharge of water into a stream or reservoir. As the water rises in the stream or reservoir, the float C rises with it and gradually closes the valve B, so that when the rising water reaches near the height of the mouth of the drain-pipe A the valve B fits closely over the mouth of the drain-pipe, thus preventing the backflow. As the water continues to rise, the pressure exerted upon the valve B by the float C is increased. To protect the float C from injury by floating logs or débris, a protecting-work may be built in the water, or it may be placed in a nook in the bank out of main current.

I am aware that prior to my invention automatically-acting water-drains have been made which are said to prevent the backflow of water by the rising of a float, thus closing a valve in the drain-pipe; but I am not aware that any such machines have been invented which are not inclosed within the drain-pipe or cavity connected therewith, nor that there have been made any such machines all parts of which are exterior to the drain-pipe, as mine is. I therefore do not claim such a combination, broadly; but What I do claim as my invention, and desire to secure by Letters Patent, is—

1. In automatic drains all parts of which are exterior to the orifice to be closed, the combination of the float C, fastened to the long arm of the lever D, which works on a fulcrum, as at c c c, the shank I, the connecting-link or drive-bar E, the valve or cap B, all connected together, as shown, with the collar G, fitted over the drain-pipe A, and the rubber washer H, against which fits the V-shaped flange of the valve B, all substantially as described.

2. The combination of the collar G with the rubber washer H, fitted against said collar, and the valve B, constructed with its V-shaped flange, substantially as described.

3. The combination of the connecting-link or drive-bar E with the metal shank I, lever and float D C, and the valve B, all substantially as set forth.

4. The combination of the collar G with the rubber washer H and the valve B with its V-shaped flange and double ears, all substantially as detailed.

5. The combination of the connecting-link or drive-bar E with the metal shank I and the valve B, all substantially as set forth.

MARCELLUS McGARY.

Witnesses:
H. V. McCANDLESS,
A. B. BAKER.